Dec. 28, 1948.  J. M. BRIAN  2,457,525
CAPACITY BRUSH HOLDER
Filed April 12, 1945
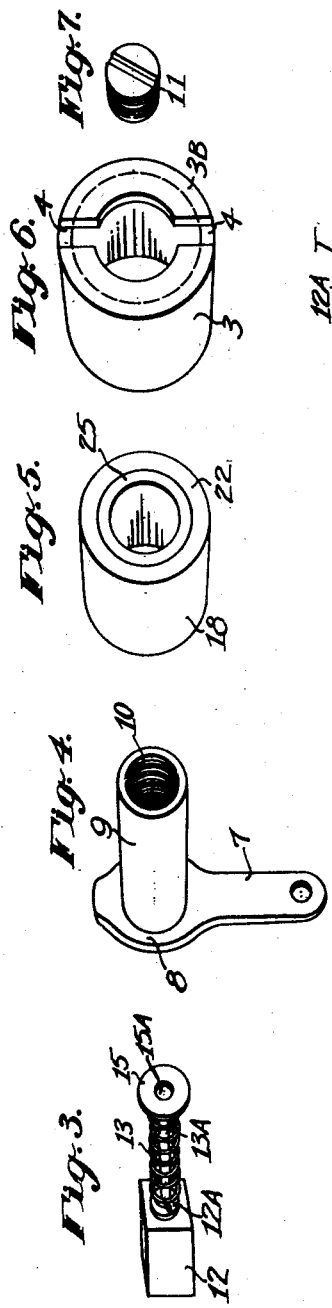
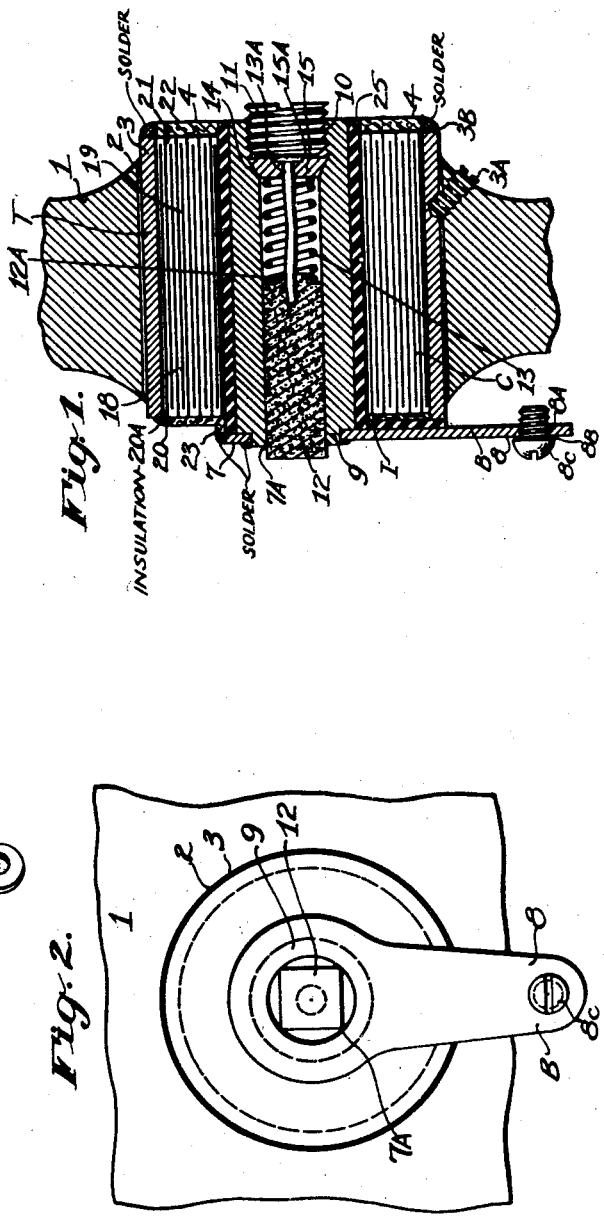
INVENTOR.
JOSEPH M. BRIAN.
BY H. S. Grover
ATTORNEY Patented Dec. 28, 1948

2,457,525

UNITED STATES PATENT OFFICE 2,457,525

CAPACITY BRUSH HOLDER

Joseph M. Brian, Westmount, Quebec, Canada, assignor to Radio Corporation of America, a corporation of Delaware Application April 12, 1945, Serial No. 587,899

6 Claims. (Cl. 171—323)

This invention relates to a new and useful capacitive brush holder for electrical devices.

An object of this invention is to provide simplified and improved apparatus operating as an electrical noise filter in rotary electrical equipment.

Another object of this invention is to provide a novel brush holder which will efficiently filter the electrical output circuit of rotary transformers (dynamotors), generators and other similar equipment such as electrical motors, utilizing brushes and collector rings or brushes and commutators.

Another object of this invention is to provide an improved capacitive brush holder which will minimize arcing at the brushes and will minimize troublesome, interfering electrical radiations from such equipment.

Although filter capacitors for rotary electrical equipment are old in the prior art, such devices as far as I am aware, are generally supplied as accessory, externally connected equipment. Even when the length of the connections to these external capacitors are extremely short, there is still a finite and appreciable impedance at ripple and radio frequencies, in series with the capacitor giving rise to undesired radiation. That is, the connection of these external capacitors causes external, closed circuits to be set up. When ripple currents and spurious high frequency alternating current components flow in these closed external circuits, electrical noise is radiated which will cause interference in nearby radio receivers.

The capacitive device of this invention effectively overcomes the disadvantages concomitant to the use of external connections of finite and appreciable impedance. In accordance with my invention a capacitive brush holder is provided of such construction that the over-all dimensions of the standard or conventional type of brush holder is only slightly increased. Connection leads to external filters are eliminated, in a way which will be more fully described later, thereby minimizing the possibility of undesired radiations.

The capacity brush holder of this invention is arranged to be attached to the frame of the machine, or electrical device in exactly the same manner as any conventional brush holder on any rotating equipment and therefore, minimizes the time and expense required for installation. In addition, the invention provides a finite and appreciable capacity having a very low series impedance at ripple and noise frequencies, directly from the brush holder to the frame of the machine which is usually grounded.

As a consequence, as indicated hereinabove, my invention tends to suppress arcing at the contact surface of brushes with either the commutator or collector rings and helps reduce radiation of electrical noise.

The capacity brush holder of this invention is particularly useful on a rotary transformer (dynamotor) such as is used generally to provide high voltage power for use in a radio transmitter or receiver.

In the accompanying drawing wherein the invention is illustrated in detail:

Fig. 1 is a cross sectional view of a typical installation of my invention;

Fig. 2 is an end view of Fig. 1 looking towards the brush; and

Figures 3 to 7 inclusive illustrate in perspective, parts of the arrangement shown in Fig. 1, prior to assembly.

Referring now in detail to Figs. 1 and 2 of the drawing, a metal frame 1 of a generator or other similar electrical equipment is provided with aperture 2 of suitable size as to accept my improved brush holder. A metallic capacitor casing member 3 forming the external part of my holder is supported by the motor frame 1 and fits snugly within aperture 2. The casing 3 and hence my brush holder is secured or fixed in place by a set screw 3A. One end of the metallic casing 3 as shown more clearly in Fig. 6 is bent or spun over at 3B and is provided with two open ended slots 4.

The brush retaining end terminal member 7 which is shown in detail in Fig. 4 has an external connection terminal member 8 which may be threaded at 8A for a terminal bolt 8C for securing thereto connection lead 8B.

A cylindrical portion 9 (see Fig. 4) is internally threaded at 10 to receive an adjustable slotted screw 11 (see Fig. 7). The cylindrical portion 9 is secured to the external terminal connection member 8 by any suitable means such as for example, by soldering or brazing, or 8 and 9 may be cast in one piece and the shank 9 machined down to a desired size. The brush retaining member 7 is also provided with an aperture 7A of proper shape and dimensions to receive the carbon or copper mesh brush 12.

A detailed illustration of brush 12 is shown in Fig. 3 wherein it will be noted that it is rectangular or square in cross section and is provided with a helical extension spring 13. The spring end of brush 12 is turned down at 12A or otherwise provided with a lug 12A to receive the helical spring 13. The central portion thereof is drilled to receive a copper wire braid 13A (see Fig. 1) the braid 13A being wedged in or soldered in the drill hole for suitable electrical connection with brush 12. A chamfered collar 15 is arranged so as to be located within the countersunk portion 14 of cylinder 9. A central countersunk aperture 15A is located in collar 15 for receiving the end of the copper braid 13A which is soldered to collar 15 within the countersunk portion 15A.

The cylindrical portion 9 of the brush retaining member is internally threaded at its right hand end to receive slotted screw 11, the arrangement being such that the slotted screw 11 jams the collar 15 against the countersunk shoulder 14 in member 9 to provide for a tight connection therewith.

A capacitive unit 18, preferably in the form of a rolled paper condenser, (see Fig. 5) is mounted around shank 9 of Figs. 4 and 1. This condenser, shown in Fig. 5 is in the form of a cylinder and consists of dielectric sheets 19 and metallic conductive sheets 20 and 21, interposed therebetween. The ends of the alternate metallic sheets of the condenser extend out to form what may be termed cylindrical bases of the roll condenser.

As shown in Fig. 1 the roll condenser of Fig. 5 may be prefabricated or it may be wound directly upon the insulating tube 25 surrounding cylinder 9. The sheets 23 of the condenser are then directly soldered to the wall 7 (see Fig. 4). Shield 3 (see Fig. 6) is then slid over the condenser of Fig. 5 and solder is dropped into slots 4 to electrically and physically connect the other sheets 22 or the other base of the condenser to the turned end of metal shield 3.

In other words, referring to Fig. 1, the capacitor C may be fabricated directly around a conventional brush holder B such as is shown in Fig. 4 and over the insulating tube I (see Fig. 1). If desired, insulating tube I may be eliminated although this may entail some additional constructional difficulty.

With the condenser roller around the insulating tube I or otherwise around the brush holder B of Fig. 4, the sheets 23 form one electrode directly soldered to the metal wall 7 of the brush holder B. In this way, there is a direct connection of very low impedance from the brush holder to one electrode of the condenser.

The metallic shield T having a turned and slotted base is then slipped over the whole assembly of brush holder B and capacitor C. Solder is dropped into the slots 4 whereby the other electrode 22 (see Fig. 5) is connected both physically and electrically substantially directly to the metal shield T. Further, the whole assembly is sealed at 20A with a suitable insulating material to provide mechanical rigidity and to guard against the entrance of moisture or harmful gases. In other words, the shield T is so designed as to fit over the condenser C and be of a length such as to leave an annular space between its left hand end and the wall 7 of the brush holder so as to prevent short circuiting. This annular space is then filled with insulating material as before explained.

Having thus described my invention, what I claim is:

1. In combination, a cylindrical brush holder for an electrical device having a grounded frame, a capacitive element in the form of a cylindrical roll condenser arranged to surround substantially the entire length of said cylindrical brush holder, said capacitive element having one terminal directly fixed, both electrically and mechanically, to said brush holder, the other terminal of said capacitive element being substantially directly connected through a path of very low impedance to the grounded frame of said electrical device.

2. In combination, a cylindrical brush holder for an electrical device, said cylindrical brush holder having a terminal connection portion at one end and a threaded portion at the other end, a capacitive element in the form of a cylindrical roll condenser arranged to surround substantially the entire length of said cylindrical brush holder, and a shield in the form of a metallic cylinder open at one end and turned over at the other, a threaded cap to adjust the brush located at the threaded portion of said holder, said turned over end being slotted so as to enable soldering one terminal of said condenser to said shield, the other terminal of said capacitive element being directly soldered to the terminal connecting portion of said brush holder.

3. Apparatus adapted to shield a brush holder for an electrical device comprising a capacitive element in the form of a cylindrical roll arranged to surround substantially the entire length of said brush holder, a shield in the form of a metallic cylinder open at one end and turned over at the other, said turned end having a slot so as to enable soldering one terminal of said element thereto.

4. Electrical shielding apparatus for an electrical brush holder or the like comprising a roll condenser adapted to surround substantially the entire length of the electrical brush holder, one base end of said condenser being adapted to be directly connected or soldered to said brush holder, and a cylindrical metallic casing having a slot located at one end and adapted to be soldered to the other base end of said roll condenser by the insertion of solder in said slot.

5. In combination, a metallic cylindrical brush holder for an electrical device having a grounded frame, a capacitive element in the form of a cylindrical roll condenser arranged to surround said cylindrical brush holder, a terminal connection member secured to one end of said cylindrical brush holder, an insulating tube having a greater length than said roll condenser interposed between said roll condenser and said brush holder, said capacitive element having one terminal directly fixed, both electrically and mechanically, to said terminal connection member of said brush holder, the other terminal of said capacitive element being substantially directly connected through a path of very low impedance to the grounded frame of said electrical device.

6. In combination, a brush holder having a metallic cylindrical shank, a terminal connection member secured to one end of said shank, a tube of insulating material in contact with, around and supported by said shank, a cylindrical condenser around the tube, and a metallic shield around the condenser, one electrode of said condenser forming one base thereof being directly soldered to said terminal connection member and the other electrode of said condenser forming the other base being directly soldered to said metallic shield.

JOSEPH M. BRIAN.

REFERENCES CITED

The following references are of record in the file of this patent:

UNITED STATES PATENTS

| Number | Name | Date |
|---|---|---|
| 1,076,806 | Ames | Oct. 28, 1913 |
| 1,683,239 | Chryst | Sept. 4, 1928 |
| 1,942,153 | Seeley | Jan. 2, 1934 |

FOREIGN PATENTS

| Number | Country | Date |
|---|---|---|
| 283,939 | Great Britain | Sept. 27, 1928 |
| 741,971 | France | Dec. 20, 1932 |